US010953873B2

(12) United States Patent
Buerkle et al.

(10) Patent No.: US 10,953,873 B2
(45) Date of Patent: Mar. 23, 2021

(54) EXTENSION TO SAFETY PROTOCOLS FOR AUTONOMOUS VEHICLE OPERATION

(71) Applicant: Intel Corporation, Santa Clara, CA (US)

(72) Inventors: Cornelius Buerkle, Karlsruhe (DE); Bernd Gassmann, Straubenhardt (DE); Fabian Oboril, Karlsruhe (DE)

(73) Assignee: Intel Corporation, Santa Clara, CA (US)

( * ) Notice: Subject to any disclaimer, the term of this patent is extended or adjusted under 35 U.S.C. 154(b) by 67 days.

(21) Appl. No.: 16/370,372

(22) Filed: Mar. 29, 2019

(65) Prior Publication Data

US 2019/0225212 A1 Jul. 25, 2019

(51) Int. Cl.
*B60W 30/09* (2012.01)
*B60W 30/095* (2012.01)
(Continued)

(52) U.S. Cl.
CPC ........ *B60W 30/09* (2013.01); *B60W 30/0956* (2013.01); *B60W 30/146* (2013.01);
(Continued)

(58) Field of Classification Search
CPC ............. B60W 30/09; B60W 30/0956; B60W 30/0953; B60W 2554/802;
(Continued)

(56) References Cited

U.S. PATENT DOCUMENTS

2004/0103010 A1\* 5/2004 Wahlbin ................. G06Q 40/08
705/4
2017/0369054 A1\* 12/2017 Nishimura ............ B60W 30/09
(Continued)

OTHER PUBLICATIONS

"On a Formal Model of Safe and Scalable Self-driving Cars" to Shalev-Schwartz et al. ("Schwartz"), available at: https://arxiv.org/pdf/1708.06374.pdf, attached PDF referencing version 5 published Mar. 15, 2018 (Year: 2018).\*

*Primary Examiner* — Kenneth J Malkowski
(74) *Attorney, Agent, or Firm* — Schwegman Lundberg & Woessner, P.A.

(57) ABSTRACT

Various systems and methods for controlling a vehicle using driving policies are described herein. A system for controlling a vehicle using driving policies includes a memory device; and a processor subsystem to access instructions on the memory device that cause the processor subsystem to: operate a host vehicle using a driving policy from a policy repository, the host vehicle operating in a lane on a first road, the driving policy governed by a safety model; detect a second vehicle, the second vehicle operating in a second lane; determine whether the second vehicle is an oncoming vehicle or an intersecting vehicle, the oncoming vehicle operating on the first road with the first and second lanes in adjacent bidirectional arrangement, and the intersecting vehicle operating on a second road that intersects the first road; and initiate a vehicle maneuver of the host vehicle to reduce or avoid a collision with the second vehicle, based on the safety model, the vehicle maneuver performed based on whether the second vehicle is an oncoming vehicle or an intersecting vehicle.

21 Claims, 5 Drawing Sheets

(51) Int. Cl.
*B60W 30/14* (2006.01)
*G06K 9/00* (2006.01)

(52) U.S. Cl.
CPC ..... *G06K 9/00798* (2013.01); *G06K 9/00805* (2013.01); *G06K 9/00825* (2013.01); *B60W 2554/801* (2020.02); *B60W 2555/60* (2020.02)

(58) Field of Classification Search
CPC ..... B60W 2554/801; B60W 2554/804; B60W 30/095; G01S 17/931; G08G 1/166; B60Y 2300/18158; G05D 1/0289
See application file for complete search history.

(56) References Cited

U.S. PATENT DOCUMENTS

| | | | |
|---|---|---|---|
| 2019/0088148 A1* | 3/2019 | Jacobus | B60W 10/18 |
| 2019/0243371 A1* | 8/2019 | Nister | G05D 1/0231 |

* cited by examiner

EXTENSION TO SAFETY PROTOCOLS FOR AUTONOMOUS VEHICLE OPERATION

TECHNICAL FIELD

Embodiments described herein generally relate to autonomous vehicle systems, and in particular, to an extension to safety protocols for autonomous vehicle operation.

BACKGROUND

Advancements in autonomous vehicle operation continue to be developed and released. In the future, fully autonomous vehicles may be operating on open roads. Such autonomous vehicles may interact with conventional human-operated vehicles. Developers are designing autonomous vehicle operation to operate in a manner that is at least as safe as human-operated ones.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
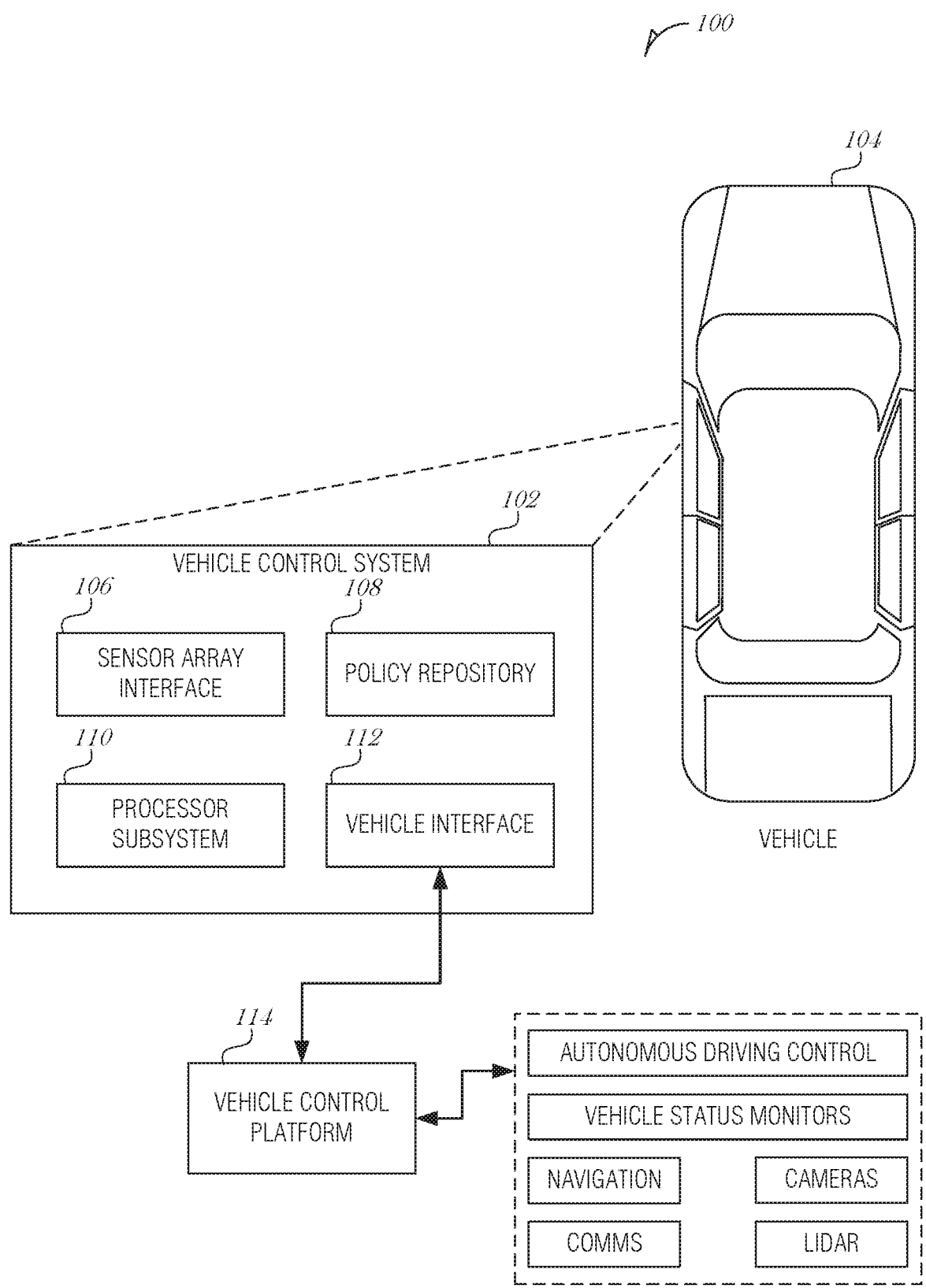
FIG. 1 is a schematic drawing illustrating a system to control an autonomous vehicle 104, according to an embodiment.

In the following description, for purposes of explanation, numerous specific details are set forth in order to provide a thorough understanding of some example embodiments. It will be evident, however, to one skilled in the art that the present disclosure may be practiced without these specific details.

Autonomous vehicles (AVs) are vehicles that are capable of operating without human assistance. AVs may operate in a fully-autonomous mode or a partially-autonomous mode. When in a partially-autonomous mode, the AV may provide some autonomous functionality, such as lane departure monitoring, speed control, collision avoidance, or the like while the human operator performs other aspects of driving, such as steering. An example AV is provided in FIG. 1 and discussed further below.

Driving policies are a major component of AV operation and are used to govern the AV in various situations. A driving policy is one or more rules that are reduced to formulas, comparisons, statistical evaluations, or the like. A driving policy may be implemented through the use of a machine learning algorithm, a rule-based decision tree, or other heuristic constructs. The driving policy may be one of several policies used with the AV.

Driving policies may be used to control an AV in various situations. The driving policies act in stages: sense, plan, and act. First, environmental and contextual data is sensed. Then a plan is identified using various policies, rules, or other decision-making mechanisms. Finally, an action is invoked. The action may be an autonomous vehicle maneuver, such as a steering, a braking, or an acceleration action. Other actions are also included in the scope of available actions.

To support driving policies, a mathematically-based safety model has been constructed. The model is used to assure that when a driving policy misbehaves are does not address a given situation, the model may provide a fallback policy to provide safe AV operation. A baseline safety model named "Responsible Sensitive Safety" (RSS) is described in the document Shalev-Shwartz, Shai, Shaked Shammah, and Amnon Shashu, "On a formal model of safe and scalable self-driving cars," arXiv preprint arXiv:1708.06374 (2017), version 5, which is incorporated herein in its entirety. RSS is a safety layer, which is placed outside or around a driving policy to compensate for potential errors of the driving policy by restricting the planning output and with that preventing the AV from causing an accident.

While the baseline safety model is valuable, in many cases, it assumes a perfect sensing environment. In contrast, the real world has noisy sensing data. With such noisy data, a vehicle may not be able to determine whether it is operating on the correct or incorrect lane or whether it is in front or behind another vehicle. As a result, proper vehicle behavior under the baseline safety model may not be observed. Thus, in order to address these imperfect sensing scenarios, the extensions discussed with respect to FIGS. 2 and 3 may be used to guarantee safe behavior even with noisy sensor data.

The present disclosure describes an improved safety model and associated rules to provide better planning and resulting actions. Via these improvements, sensing mechanisms are largely independent from some planning phases, minimizing or ignoring noisy sensor readings. Other planning policies account for inaccurate or imperfect sensing data by providing improved planning mechanisms, again, mitigating the effects of noisy sensor readings. These advantages and others are described further herein.

FIG. 1 is a schematic drawing illustrating a system 100 to control an autonomous vehicle 104, according to an embodiment. FIG. 1 includes a vehicle control system 102 incorporated into the vehicle 104. The vehicle control system 102 includes a sensor array interface 106, a policy repository 108, a processor subsystem 110, and a vehicle interface 112.

Vehicles 104 may include various forward, sideward, and rearward facing sensors. The sensors may include radar, LiDAR (light imaging detection and ranging), cameras, ultrasound, infrared, or other sensor systems. Front-facing sensors may be used for adaptive cruise control, parking assistance, lane departure, collision avoidance, pedestrian detection, and the like. Rear-facing sensors may be used to alert the driver of potential obstacles (e.g., vehicles) when performing lane changes or when backing up at slow speeds (e.g., parking distance monitors).

The vehicle 104, which may also be referred to as an "ego vehicle" or "host vehicle", may be of any type of vehicle, such as a commercial vehicle, a consumer vehicle, a recreation vehicle, a car, a truck, a motorcycle, a boat, a drone, a robot, an airplane, a hovercraft, or any mobile craft able to operate at least partially in an autonomous mode. The vehicle 104 may operate at some times in a manual mode where the driver operates the vehicle 104 conventionally using pedals, steering wheel, and other controls. At other times, the vehicle 104 may operate in a fully autonomous mode, where the vehicle 104 operates without user intervention. In addition, the vehicle 104 may operate in a semi-autonomous mode, where the vehicle 104 controls many of the aspects of driving, but the driver may intervene or influence the operation using conventional (e.g., steering wheel) and non-conventional inputs (e.g., voice control).

The sensor array interface 106 may be used to provide input/output signaling to the vehicle control system 102 from one or more sensors of a sensor array installed on the vehicle 104. Examples of sensors include, but are not limited to microphones; forward, side, and rearward facing cameras; radar; LiDAR; ultrasonic distance measurement sensors; or other sensors. Forward-facing or front-facing is used in this document to refer to the primary direction of travel, the direction the seats are arranged to face, the direction of travel when the transmission is set to drive, or the like. Conventionally then, rear-facing or rearward-facing is used to describe sensors that are directed in a roughly opposite direction than those that are forward or front-facing. It is understood that some front-facing camera may have a relatively wide field of view, even up to 180-degrees. Similarly, a rear-facing camera that is directed at an angle (perhaps 60-degrees off center) to be used to detect traffic in adjacent traffic lanes, may also have a relatively wide field of view, which may overlap the field of view of the front-facing camera. Side-facing sensors are those that are directed outward from the sides of the vehicle 104. Cameras in the sensor array may include infrared or visible light cameras, able to focus at long-range or short-range with narrow or large fields of view.

The vehicle 104 may also include various other sensors, such as driver identification sensors (e.g., a seat sensor, an eye tracking and identification sensor, a fingerprint scanner, a voice recognition module, or the like), occupant sensors, or various environmental sensors to detect wind velocity, outdoor temperature, barometer pressure, rain/moisture, or the like. Other sensor data may be available via the sensor array interface 106, such as geolocation from a GPS receiver, time and date, ego-motion of the vehicle (e.g., pitch, yaw, roll, etc.), vehicle speed, vehicle acceleration, or other vehicle telemetry data.

Sensor data is used to determine the vehicle's operating context, environmental information, road conditions, travel conditions, or the like. The sensor array interface 106 may communicate with another interface, such as an onboard navigation system, of the vehicle 104 to provide or obtain sensor data. Components of the vehicle control system 102 may communicate with components internal to the vehicle control system 102 or components that are external to the platform 102 using a network, which may include local-area networks (LAN), wide-area networks (WAN), wireless networks (e.g., 802.11 or cellular network), ad hoc networks, personal area networks (e.g., Bluetooth), vehicle-based networks (e.g., Controller Area Network (CAN) BUS), or other combinations or permutations of network protocols and network types. The network may include a single local area network (LAN) or wide-area network (WAN), or combinations of LANs or WANs, such as the Internet. The various devices coupled to the network may be coupled to the network via one or more wired or wireless connections.

The vehicle control system 102 may communicate with a vehicle control platform 114. The vehicle control platform 114 may be a component of a larger architecture that controls various aspects of the vehicle's operation. The vehicle control platform 114 may have interfaces to autonomous driving control systems (e.g., steering, braking, acceleration, etc.), comfort systems (e.g., heat, air conditioning, seat positioning, etc.), navigation interfaces (e.g., maps and routing systems, positioning systems, etc.), collision avoidance systems, communication systems, security systems, vehicle status monitors tire pressure monitor, oil level sensor, speedometer, etc.), and the like. In conjunction with the vehicle control system 102, the vehicle control platform 114 may control one or more subsystems. For instance, the vehicle control system 102 may be used in a sensor fusion mechanism with other sensors (e.g., cameras, LiDAR, GPS, etc.), where the signals are used to augment, corroborate, or otherwise assist in object type detection, object identification, object position or trajectory determinations, and the like.

In the automotive context, advanced driver assistance systems (ADAS) are those developed to automate, adapt, or enhance vehicle systems to increase safety and provide better driving. In such systems, safety features are designed to avoid collisions and accidents by offering technologies that alert the driver to potential problems, or to avoid collisions by implementing safeguards and taking over control of the vehicle. ADAS relies on various sensors that are able to detect objects and other aspects of their operating environment. Examples of such sensors include visible light cameras, radar, laser scanners LiDAR), acoustic (e.g., sonar), and the like.

The policy repository 108 may be used to store driving policies, safety models, rules, configuration data, and other information to control or govern the operation of the AV. The policy repository 108 may be stored in one more memory devices. Alternatively, the policy repository 108 may be stored in a network-accessible location (e.g., a cloud server).

Figure 2:
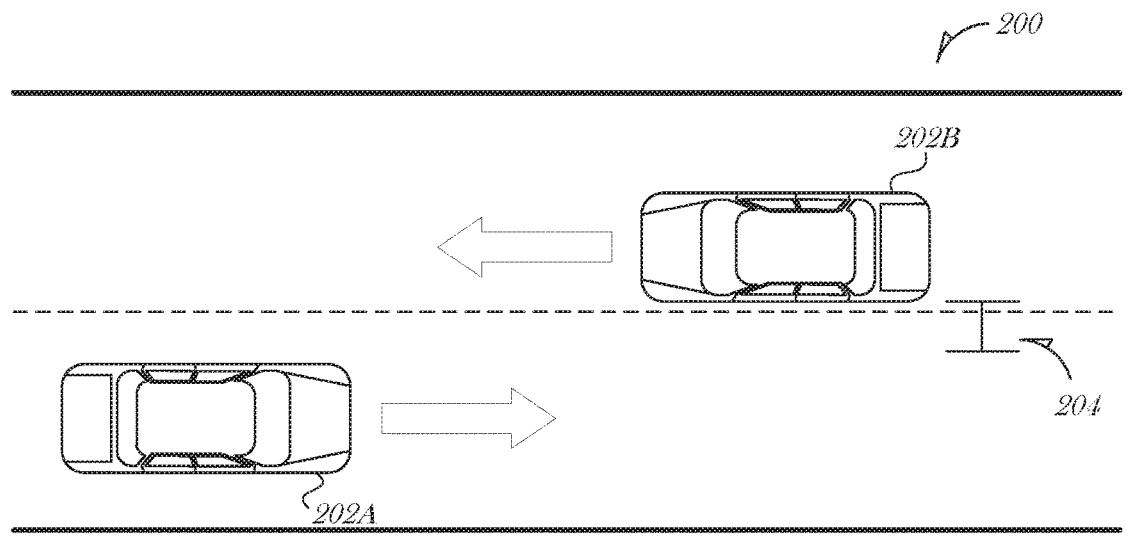
FIG. 2 is a diagram illustrating a driving context, according to an embodiment.

FIG. 2 is a diagram illustrating a driving context 200, according to an embodiment. In the driving context 200, two vehicles 202A, 202B are approaching one another. Each vehicle 202A, 202B are in their appropriate driving lane and are approaching each other from the opposite direction (as indicated by the arrows). In the driving context 200 illustrated, the lateral distance 204 between the two vehicles 202A, 202B is not large enough. The lateral distance 204 may be below a threshold measurement as defined by a baseline safety model (e.g., RSS).

RSS includes a definition of what is considered a proper response to dangerous longitudinal situations. The definition is provided here for reference.

Definition 4 (Proper Response to Dangerous Longitudinal Situations)

Let t be a dangerous time for cars $c_1$, $c_2$ and let $t_b$ be the corresponding blame time. The proper behavior of the two cars is to comply with the following constraints on the longitudinal speed:

1. If at the blame time, the two cars were driving at the same direction, and say that $c_1$ is the rear car, then:
   i. $c_1$ acceleration must be at most $a_{max,accel}$ during the interval $[t_b, t_b+\rho)$ and at most $-a_{min,brake}$ from time $t_b+\rho$ until reaching a full stop. After that, any non-positive acceleration is allowed.
   ii. $c_2$ acceleration must be at least $-a_{max,brake}$ until reaching a full stop. After that, any non-negative acceleration is allowed.
2. If at the blame time the two cars were driving at opposite directions, and say that $c_2$ was driving at the wrong direction (negative velocity), then:

i. $c_1$ acceleration must be at most $a_{max,accel}$ during the interval $[t_b, t_b+\rho)$ and at most $-a_{min,brake,correct}$ from time $t_b+\rho$ until reaching a full stop. After that, it can apply any non-positive acceleration ii. $c_2$ acceleration must be at least $-a_{max,accel}$ during the interval $[t_b, t_b+\rho)$ and at least $a_{min,brake}$ from time $t_b+\rho$ until reaching a full stop. After that, any non-negative acceleration is allowed.

As such, in the event of a dangerous situation, the vehicle that is in its own lane may brake with a lower force than the vehicle in the opposite direction. This definition may lead to a correct behavior of the two vehicles if it is obvious which vehicle is in its own lane and the other vehicle is driving in the lane belonging to the vehicle in the correct lane. However, there are some situations where this cannot be determined. In a bidirectional single lane road, such as the one illustrated in FIG. 2, each vehicle 202A, 202B may determine that it is the one in the correct lane and neither vehicle may come to a complete stop. This may cause a lateral conflict, such as a sideswipe accident (e.g., both vehicles grazing the side of the other).

To avoid this collision, the policy definition of the baseline policy may be extended such that both vehicles 202A, 202B must brake according to the stated braking pattern, when the longitudinal distance is not safe, given that both vehicles 202A, 202B accelerate at maximum during their response time and brake with $a_{min,brake}$. If this case does not apply and the longitudinal distance is not safe, then the vehicle in the correct lane has to brake with $a_{min,brake,correct}$ and the vehicle in the wrong lane has to conduct the stated braking pattern. This is the situation covered by the baseline policy. As a result of adding case 1 and extending the baseline policy, when two vehicles approach each other and each are in their correct respective lanes, each vehicle will brake with $a_{min,brake}$.

Figure 3:
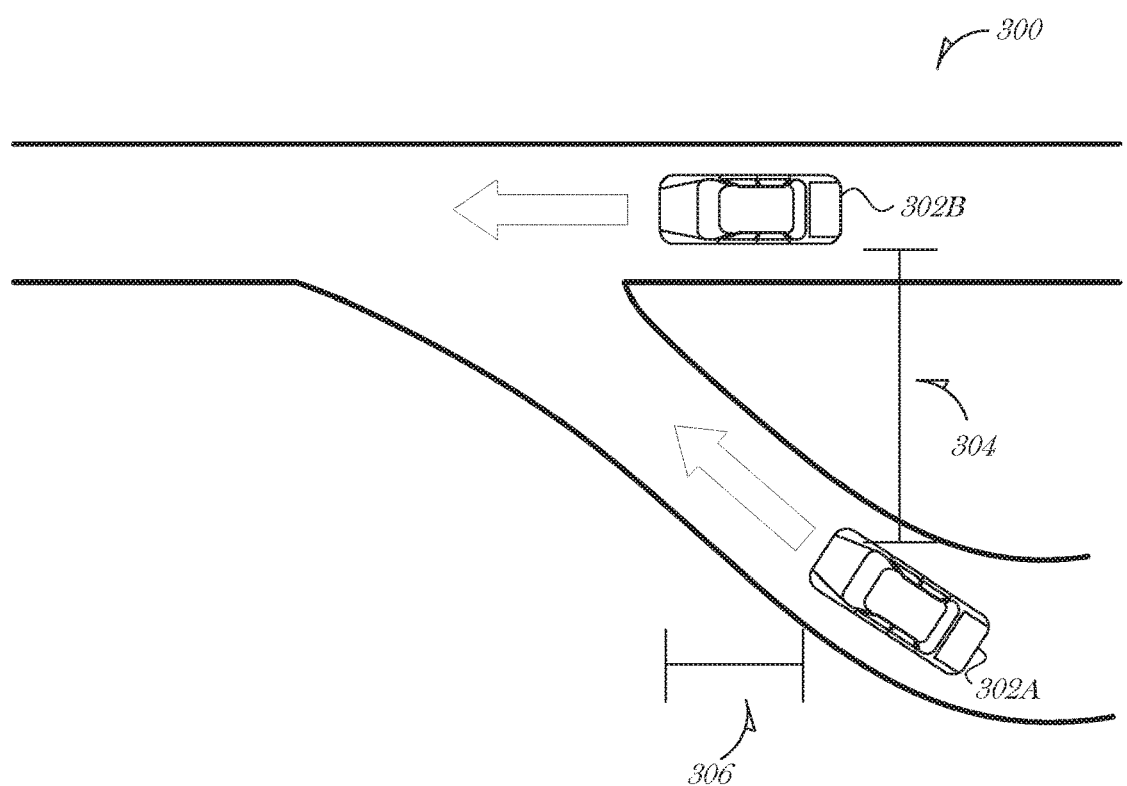
FIG. 3 is a diagram illustrating a driving context, according to an embodiment.

FIG. 3 is a diagram illustrating a driving context 300, according to an embodiment. In the driving context 300, two vehicles 302A, 302B are approaching one another at an intersection. Each vehicle 302A, 302B are operating on respective routes that intersect. In the driving context 300 illustrated, the vehicles 302A, 302B are separated by a lateral distance 304 and a longitudinal distance 306.

RSS (e.g., baseline safety model) includes a definition of what is considered a proper response for vehicles on routes of different geometry. The definition is provided here for reference.

Definition 14 (Dangerous & Blame Times, Proper Response, and Responsibility for Routes of Different Geometry)

Consider vehicles $c_1$, $c_2$ driving on routes $r_1$, $r_2$. Time t is dangerous if both the lateral and longitudinal distances are non-safe (according to Definition 11 and Definition 13). The corresponding blame time is the earliest non-dangerous time $t_b$ s.t. all times in $(t_b, t]$ are dangerous. The proper response depends on the situation immediately before the blame time:

1. If the lateral distance was safe, then both cars should respond according to the description of lateral safe distance in Definition 11.
2. Else, if the longitudinal distance was safe according to item (1) in Definition 13, then if a vehicle is on the prioritized route it can drive normally, and otherwise it must brake by at least $a_{min,brake}$ if $t-t_b \geq \rho$.
3. Else, if the longitudinal distance was safe according to item (2) in Definition 13, then $c_1$ can drive normally and $c_2$ must brake by at least $a_{min,brake}$ if $t-t_b \geq \rho$.
4. Else, if the longitudinal distance was safe according to item (3) in Definition 13, then both cars can drive normally if $t-t_b < \rho$, and otherwise, both cars should brake laterally and longitudinally by at least $a_{min,brake}^{lat}$, $a_{min,brake}$ (each one w.r.t. its own route).

Finally, if a collision occurs, then the responsibility is on the vehicle(s) that did not comply with the proper response.

Definitions 11, 12, and 13 are provided here for reference.

Definition 11 (Lateral Safe Distance for Two Routes of Different Geometry)

Consider vehicles $c_1$, $c_2$ driving on routes $r_1$, $r_2$ that intersect. For every $i \in \{1,2\}$, let $[x_{i,min}, x_{i,max}]$ be the minimal and maximal lateral positions in $r_i$ that $c_i$ can be in, if during the time interval $[0; \rho)$ it will apply a lateral acceleration (w.r.t. $r_i$) s.t. $|a^{lat}| \leq a_{max,accel}^{lat}$, and after that it will apply a lateral braking of at least $a_{min,brake}^{lat}$ (again w.r.t. $r_i$), until reaching a zero lateral velocity (w.r.t. $r_i$). The lateral distance between $c_1$ and $c_2$ is safe if the restrictions of $r_1$, $r_2$ to the lateral intervals $[x_{1,min}, x_{1,max}]$, $[x_{2,min}, x_{2,max}]$ are at a distance of at least $\mu$.

Definition 12 (Longitudinal Ordering for Two Routes of Different Geometry)

Consider $c_1$, $c_2$ driving on routes $r_1$, $r_2$ that intersect. We say that $c_1$ is longitudinally in front of $c_2$ if either of the following holds:

1. For every i, if both vehicles are on $r_i$ then $c_1$ is in front of $c_2$ according to $r_i$
2. $c_1$ is outside $r_2$ and $c_2$ is outside $r_1$, and the longitudinal distance from $c_1$ to the set $r_1 \cap r_2$, w.r.t. $r_1$, is larger than the longitudinal distance from $c_2$ to the set $r_i \cap r_2$, w.r.t. $r_2$.

Definition 13 (Longitudinal Safe Distance for Two Routes of Different Geometry)

Consider $c_1$, $c_2$ driving on routes $r_1$, $r_2$ that intersect. The longitudinal distance between $c_1$ and $c_2$ is safe if one of the following holds:

1. If for all $i \in \{1,2\}$ s.t. $r_i$ has no priority, if $c_i$ will accelerate by $a_{max,accel}$ for $\rho$ seconds, and will then brake by $a_{min,brake}$ until reaching zero longitudinal velocity (all w.r.t. $r_i$), then during this time $c_i$ will remain outside of the other route.
2. Otherwise, if $c_1$ is in front of $c_2$ (according to Definition 12), then they are at a safe longitudinal distance if in case $c_1$ will brake by $a_{max,brake}$ until reaching a zero velocity (w.r.t. $r_1$), and $c_2$ will accelerate by at most $a_{max,accel}$ for $\rho$ seconds and then will brake by at least $a_{min,brake}$ (w.r.t. $r_2$) until reaching a zero velocity, then $c_1$ will remain in front of $c_2$ (according to Definition 12).
3. Otherwise, consider a point $p \in r_1 \cap r_2$ s.t. for $i \in \{1,2\}$, the lateral position of p w.r.t. $r_i$ is in $[x_{i,min}, x_{i,max}]$ (as defined in Definition 11). Let $[t_{i,min}, t_{i,max}]$ be all times s.t. $c_i$ can arrive to the longitudinal position of p w.r.t. $r_i$ if it will apply longitudinal accelerations in the range $[-a_{min,brake}, a_{max,accel}]$ during the first $\rho$ seconds, and then will apply longitudinal braking in the range $[a_{min,brake}, a_{max,brake}]$ until reaching a zero velocity. Then, the vehicles are at a safe longitudinal distance if for every such p we have that $[t\ t_{1,min}, t_{1,max}]$ does not intersect $[t_{2,min}, t_{2,max}]$.

While the baseline policy is fairly comprehensive, the policy only guarantees a collision-free behavior if both vehicles act according to the defined formulas. If the non-prioritized vehicle does not brake correctly, then the baseline policy does not cause the prioritized vehicle to slow down to avoid the collision. This behavior contradicts logic that vehicles should avoid collisions when able. As such, the policy definition of the baseline policy is extended such that if the non-prioritized vehicle cannot brake before of the intersection, and the paths of the vehicles are conflicted (e.g., point 4 of Definition 14), then both vehicles shall brake laterally and longitudinally by at least $a_{min,brake}^{lat}$, $a_{min,brake}$. This covers the case where the non-prioritized vehicle fails to stop before the intersection, and the prioritized vehicle could stop before the intersection, but because of the baseline policy, would not even attempt to do so.

The vehicle driving policies described above typically assume a worst case scenario and that the vehicles involved are able to accelerate with maximum allowed acceleration during their response time. In a real world environment, such acceleration may be unduly dangerous to the passengers of the vehicles or to other motorists, pedestrians, or people around the roadway. As such, in some embodiments, the formulas used in the driving policies are adapted so that each vehicle is limited and is only allowed to accelerate up to the allowed speed limit.

As an example, in Lemma 2 of the baseline driving policy, a safe distance to sheer-in (e.g., merge) in front of another vehicle is defined. Lemma 2 is reproduced here for reference.

Lemma 2 Let $c_r$ be a vehicle which is behind $c_f$ on the longitudinal axis. Let $\rho$, $a_{max,brake}$, $a_{max,accel}$, $a_{min,brake}$ be as in Definition 1. Let $v_r$, $v_f$ be the longitudinal velocities of the cars. Then, the minimal safe longitudinal distance between the front-most point of $c_r$ and the rear-most point of $c_f$ is:

$$d_{min} = \left[ v_r\rho + \frac{1}{2}a_{max,accel}\rho^2 + \frac{(v_r + \rho a_{max,accel})^2}{2a_{min,brake}} - \frac{v_f^2}{2a_{max,brake}} \right]_+$$

Definition 1 is provided here for reference:

Definition 1 (Safe Longitudinal Distance—Same Direction)

A longitudinal distance between a car $c_r$ that drives behind another car $c_f$, where both cars are driving at the same direction, is safe w.r.t. a response time $\rho$ if for any braking of at most $a_{max,brake}$, performed by $c_f$, if $c_r$ will accelerate by at most $a_{max,accel}$ during the response time, and from there on will brake by at least $a_{min,brake}$ until a full stop then it won't collide with $c_f$.

Based on Lemma 2, the distance to sheer-in is calculated. As a result, when both cars drive with urban speed (e.g., 50 km/h), a safety distance of 78 m is required. This is infeasible for urban driving. Applying the restriction of limiting the maximum acceleration to the speed limit, the safety distances reduce to 16 m, which is much more reasonable. This is based on the parameters of $\rho=2$ s, $a_{max,brake}=8$ m/s$^2$, $a_{max,accel}=3.5$ m/s$^2$, and $a_{min,brake}=4$ m/s$^2$.

Use of a Road Model During Autonomous Vehicle Operation

A road model may be used by a vehicle to navigate over roadways. The road model may include information about roads, intersections, and objects nearby the roads. Road information may include, but is not limited to, surface type, road condition, speed limits, lane information, lane restrictions, and the like. Intersection information may include, but is not limited to, intersection types, traffic controls (e.g., stop signs or light signals), turn lane information, right-of-way information, and the like. Other objects around the roadways may include information about guard rails, hike paths, walkways, sidewalks, medians, lane dividers, sign posts, light posts, mailboxes, tollbooths, and the like.

The road model may include geographic information, dimensional information, temporal information, and other information about roads, intersections, or objects near roads. This information may be determined by direct measurement (e.g., human surveys, inspection reports, manufacturer details, etc.), indirect measurements (e.g., satellite image analysis, on-vehicle camera imagery, etc.), or the like.

RSS only defines vehicle behavior during interactions between vehicles and objects (e.g., other vehicles). RSS may not consider the boundaries of the driving surface. As such, RSS does not guarantee that a vehicle will not be involved in an accident due to leaving the road.

To overcome this deficiency, virtual objects may be added to the input of RSS. These virtual objects describe, e.g., the border of a lane, that must not be crossed by the vehicle. The virtual objects provide the same attributes as normal objects, except that velocity and acceleration of a virtual object is always zero. All RSS rules and the extensions to RSS discussed here may be applied to virtual objects as well. This will ensure that the vehicle will not leave the road.

The virtual objects may be constructed as a fence, guard rail, wall, posts, or other objects that virtually define the edge of the road surface or other permissible operating area. As a result, the vehicle may use the various driving policies with respect to the virtual objects—in much the same way as with real objects—in order to maintain safe operation (e.g., safe distances, speeds, braking, etc.). Virtual objects may be defined and inserted into a road model by a vehicle manufacturer, city planner or other government agency, the vehicle operator, or by other mechanisms.

Figure 4:
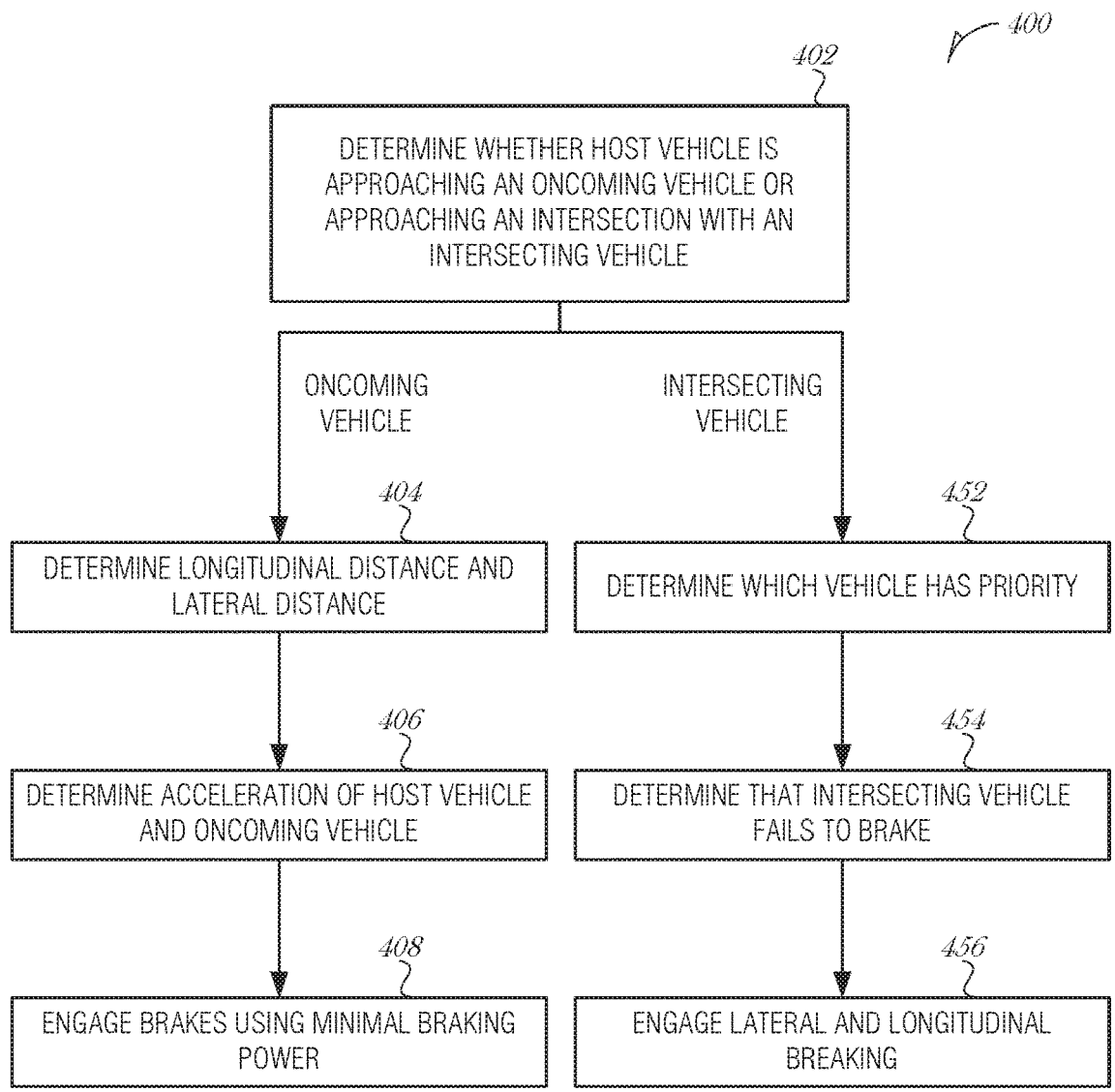
FIG. 4 is a flowchart illustrating a process to control an autonomous vehicle, according to an embodiment.

FIG. 4 is a flowchart illustrating a process 400 to control an autonomous vehicle, according to an embodiment. At 402, a host vehicle controlled by a driving policy determines whether the host vehicle is approaching an oncoming vehicle on a bi-directional road or if the host vehicle is approaching an intersection with another intersecting vehicle approaching the same intersection.

If the host vehicle is approaching an oncoming vehicle, then the host vehicle determines a longitudinal and a lateral distance between the host vehicle and the oncoming vehicle (operation 404). If the longitudinal distance and lateral distance are less than a threshold, then the host vehicle determines whether the host vehicle and the oncoming vehicles are each accelerating at maximum acceleration during their response time and braking with minimum braking (operation 406). If this is the case, then the host vehicle engages its brakes using the minimal braking power until it comes to a complete stop (operation 408). Note that the oncoming vehicle may abide by the same driving policy and as such, may also use minimal braking power to come to a complete stop.

If the host vehicle is approaching an intersection with an intersecting vehicle, then it is determined which vehicle has the priority (operation 452). Priority may be determined by which vehicle is considered to be in front of the other vehicle longitudinally (see Definition 12 above). In this case, the host vehicle is in front of the intersecting vehicle and the host vehicle is granted priority and will operate as if it has right-of-way. The host vehicle determines that the intersecting vehicle fails to brake correctly (operation 454). In this case, the host vehicle acts to avoid potential collision by braking laterally and longitudinally by at least minimum braking in the lateral and longitudinal directions (operation 456). Note that the intersecting vehicle may abide by the same driving policy and as such, may also use minimal lateral and longitudinal braking.

Figure 5:
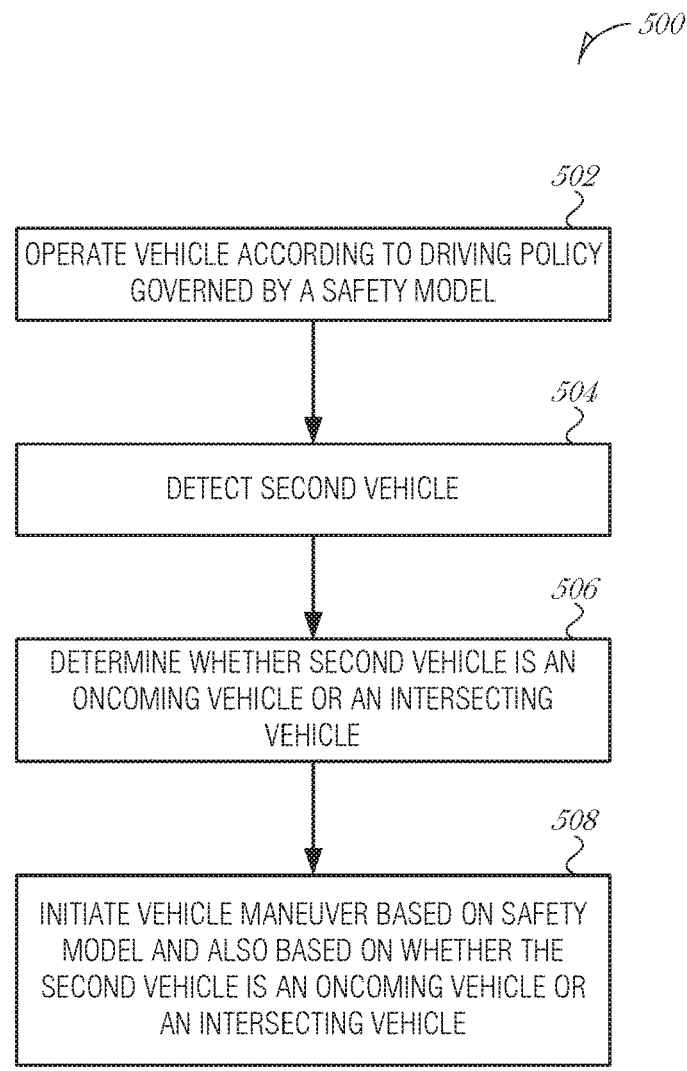
FIG. 5 is a flowchart illustrating a method of controlling a vehicle using driving policies, according to an embodiment.

FIG. 5 is a flowchart illustrating a method 500 of controlling a vehicle using driving policies, according to an embodiment. At 502, a host vehicle is operated using a driving policy from a policy repository. The host vehicle operates in a lane on a first road. The driving policy is governed by a safety model (e.g., RSS).

At 504, a second vehicle is detected, where the second vehicle is operating in a second lane.

At 506, it is determined whether the second vehicle is an oncoming vehicle or an intersecting vehicle. An oncoming vehicle is one operating on the first road with the first and second lanes in adjacent bidirectional arrangement. An intersecting vehicle is one operating on a second road that intersects the first road.

At 508, a vehicle maneuver of the host vehicle is initiated to reduce or avoid a collision with the second vehicle. The maneuver is based on the safety model. The vehicle maneuver is performed based on whether the second vehicle is an oncoming vehicle or an intersecting vehicle.

In an embodiment, initiating the vehicle maneuver of the host vehicle includes determining a longitudinal distance and a lateral distance between the host vehicle and the oncoming vehicle, determining that the longitudinal distance is below a first threshold value and that the lateral distance is below a second threshold value, and initiating a braking of the host vehicle when the longitudinal distance is below the first threshold value and the lateral distance is below the second threshold value. In a further embodiment, the maximum acceleration is bounded by a speed limit governing the road.

In an embodiment, initiating the vehicle maneuver of the host vehicle includes determining that the host vehicle has priority over the second vehicle to right-of-way at the intersection of the first and second road, determining that the second vehicle fails to brake and provide right-of-way to the host vehicle, and initiating a braking of the host vehicle when the host vehicle has priority and the second vehicle fails to brake.

In an embodiment, the method 500 includes using virtual objects to describe road boundaries in the safety model. In a related embodiment, the method 500 includes using virtual objects to describe static obstacles in the safety model.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (CPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture.

Figure 6:
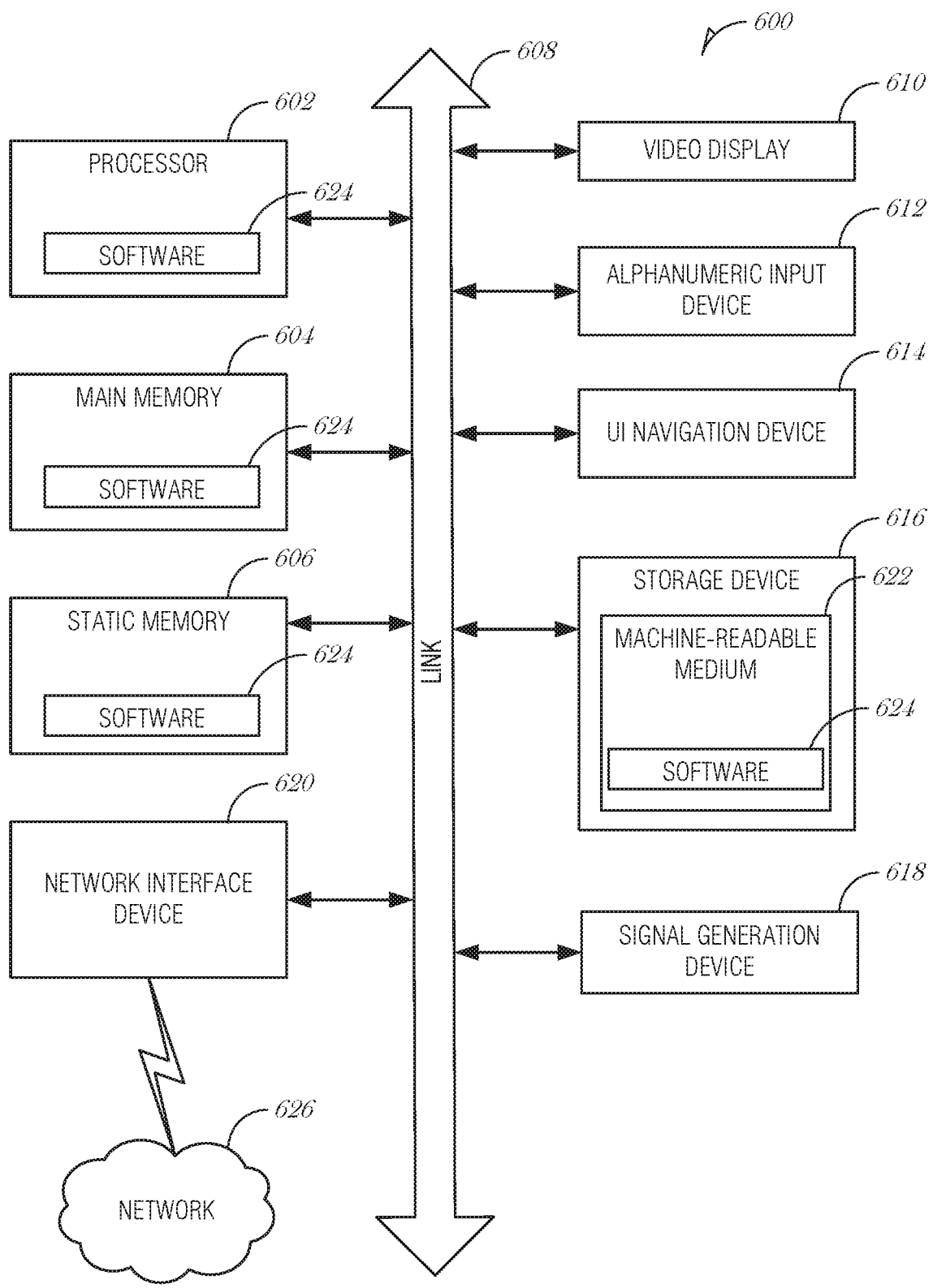
FIG. 6 is a block diagram illustrating an example machine upon which any one or more of the techniques (e.g., methodologies) discussed herein may perform, according to an embodiment.

FIG. 6 is a block diagram illustrating a machine in the example form of a computer system 600, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a vehicle subsystem, a personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, gyrometer, magnetometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include nonvolatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, DSRC, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 is a system for controlling a vehicle using driving policies, the system comprising: a memory device; and a processor subsystem to access instructions on the memory device that cause the processor subsystem to: operate a host vehicle using a driving policy from a policy repository, the host vehicle operating in a lane on a first road, the driving policy governed by a safety model; detect a second vehicle, the second vehicle operating in a second lane; determine whether the second vehicle is an oncoming vehicle or an intersecting vehicle, the oncoming vehicle operating on the first road with the first and second lanes in adjacent bidirectional arrangement, and the intersecting vehicle operating on a second road that intersects the first road; and initiate a vehicle maneuver of the host vehicle to reduce or avoid a collision with the second vehicle, based on the safety model, the vehicle maneuver performed based on whether the second vehicle is an oncoming vehicle or an intersecting vehicle.

In Example 2, the subject matter of Example 1 includes, wherein to initiate the vehicle maneuver of the host vehicle, the processor subsystem is to: determine a longitudinal distance and a lateral distance between the host vehicle and the oncoming vehicle; determine that the longitudinal distance is below a first threshold value and that the lateral distance is below a second threshold value; and initiate a braking of the host vehicle when the longitudinal distance is below the first threshold value and the lateral distance is below the second threshold value.

In Example 3, the subject matter of Example 2 includes, wherein the maximum acceleration is bounded by a speed limit governing the road.

In Example 4, the subject matter of Examples 1-3 includes, wherein to initiate the vehicle maneuver of the host vehicle, the processor subsystem is to: determine that the host vehicle has priority over the second vehicle to right-of-way at the intersection of the first and second road; determine that the second vehicle fails to brake and provide right-of-way to the host vehicle; and initiate a braking of the host vehicle when the host vehicle has priority and the second vehicle fails to brake.

In Example 5, the subject matter of Examples 1-4 includes, using virtual objects to describe road boundaries in the safety model.

In Example 6, the subject matter of Examples 1-5 includes, using virtual objects to describe static obstacles in the safety model.

Example 7 is a method for controlling a vehicle using driving policies, the method comprising: operating a host vehicle using a driving policy from a policy repository, the host vehicle operating in a lane on a first road, the driving policy governed by a safety model; detecting a second vehicle, the second vehicle operating in a second lane; determining whether the second vehicle is an oncoming vehicle or an intersecting vehicle, the oncoming vehicle operating on the first road with the first and second lanes in adjacent bidirectional arrangement, and the intersecting vehicle operating on a second road that intersects the first road; and initiating a vehicle maneuver of the host vehicle to reduce or avoid a collision with the second vehicle, based on the safety model, the vehicle maneuver performed based on whether the second vehicle is an oncoming vehicle or an intersecting vehicle.

In Example 8, the subject matter of Example 7 includes, wherein initiating the vehicle maneuver of the host vehicle comprises: determining a longitudinal distance and a lateral distance between the host vehicle and the oncoming vehicle; determining that the longitudinal distance is below a first threshold value and that the lateral distance is below a second threshold value; and initiating a braking of the host vehicle when the longitudinal distance is below the first threshold value and the lateral distance is below the second Threshold value.

In Example 9, the subject matter of Example 8 includes, wherein the maximum acceleration is bounded by a speed limit governing the road.

In Example 10, the subject matter of Examples 7-9 includes, wherein initiating the vehicle maneuver of the host vehicle comprises: determining that the host vehicle has priority over the second vehicle to right-of-way at the intersection of the first and second road; determining that the second vehicle fails to brake and provide right-of-way to the host vehicle; and initiating a braking of the host vehicle when the host vehicle has priority and the second vehicle fails to brake.

In Example 11, the subject matter of Examples 7-10 includes, using virtual objects to describe road boundaries in the safety model.

In Example 12, the subject matter of Examples 7-11 includes, using virtual objects to describe static obstacles in the safety model.

Example 13 is at least one machine-readable medium including instructions, which when executed by a machine, cause the machine to perform operations of any of the methods of Examples 7-12.

Example 14 is an apparatus comprising means for performing any of the methods of Examples 7-12.

Example 15 is an apparatus for controlling a vehicle using driving policies, the apparatus comprising: means for operating a host vehicle using a driving policy from a policy repository, the host vehicle operating in a lane on a first road, the driving policy governed by a safety model; means for detecting a second vehicle, the second vehicle operating in a second lane; means for determining whether the second vehicle is an oncoming vehicle or an intersecting vehicle, the oncoming vehicle operating on the first road with the first and second lanes in adjacent bidirectional arrangement, and the intersecting vehicle operating on a second road that intersects the first road; and means for initiating a vehicle maneuver of the host vehicle to reduce or avoid a collision with the second vehicle, based on the safety model, the vehicle maneuver performed based on whether the second vehicle is an oncoming vehicle or an intersecting vehicle.

In Example 16, the subject matter of Example 15 includes, wherein the means for initiating the vehicle maneuver of the host vehicle comprise: means for determining a longitudinal distance and a lateral distance between the host vehicle and the oncoming vehicle; means for determining that the longitudinal distance is below a first threshold value and that the lateral distance is below a second threshold value; and means for initiating a braking of the host vehicle when the longitudinal distance is below the first threshold value and the lateral distance is below the second threshold value.

In Example 17, the subject matter of Example 16 includes, wherein the maximum acceleration is bounded by a speed limit governing the road.

In Example 18, the subject matter of Examples 15-17 includes, wherein the means for initiating the vehicle maneuver of the host vehicle comprise: means for determining that the host vehicle has priority over the second vehicle to right-of-way at the intersection of the first and second road; means for determining that the second vehicle fails to brake and provide right-of-way to the host vehicle; and means for initiating a braking of the host vehicle when the host vehicle has priority and the second vehicle fails to brake.

In Example 19, the subject matter of Examples 15-18 includes, using virtual objects to describe road boundaries in the safety model.

In Example 20, the subject matter of Examples 15-19 includes, using virtual objects to describe static obstacles in the safety model.

Example 21 is at least one machine-readable medium including instructions for controlling a vehicle using driving policies, the instructions when executed by a machine, cause the machine to perform the operations comprising: operating a host vehicle using a driving policy from a policy repository, the host vehicle operating in a lane on a first road, the driving policy governed by a safety model; detecting a second vehicle, the second vehicle operating in a second lane; determining whether the second vehicle is an oncoming vehicle or an intersecting vehicle, the oncoming vehicle operating on the first road with the first and second lanes in adjacent bidirectional arrangement, and the intersecting vehicle operating on a second road that intersects the first road; and initiating a vehicle maneuver of the host vehicle to reduce or avoid a collision with the second vehicle, based on the safety model, the vehicle maneuver performed based on whether the second vehicle is an oncoming vehicle or an intersecting vehicle.

In Example 22, the subject matter of Example 21 includes, wherein initiating the vehicle maneuver of the host vehicle comprises: determining a longitudinal distance and a lateral distance between the host vehicle and the oncoming vehicle; determining that the longitudinal distance is below a first threshold value and that the lateral distance is below a second threshold value; and initiating a braking of the host vehicle when the longitudinal distance is below the first threshold value and the lateral distance is below the second threshold value.

In Example 23, the subject matter of Example 22 includes, wherein the maximum acceleration is bounded by a speed limit governing the road.

In Example 24, the subject matter of Examples 21-23 includes, wherein initiating the vehicle maneuver of the host vehicle comprises: determining that the host vehicle has priority over the second vehicle to right-of-way at the intersection of the first and second road; determining that the second vehicle fails to brake and provide right-of-way to the host vehicle; and initiating a braking of the host vehicle when the host vehicle has priority and the second vehicle fails to brake.

In Example 25, the subject matter of Examples 21-24 includes, using virtual objects to describe road boundaries in the safety model.

In Example 26, the subject matter of Examples 21-25 includes, using virtual objects to describe static obstacles in the safety model.

Example 27 is at least one machine-readable medium including instructions that, when executed by processing circuitry, cause the processing circuitry to perform operations to implement of any of Examples 1-26.

Example 28 is an apparatus comprising means to implement of any of Examples 1-26.

Example 29 is a system to implement of any of Examples 1-26.

Example 30 is a method to implement of any of Examples 1-26.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for controlling a vehicle using driving policies, the system comprising:
   a memory device; and
   a processor subsystem to access instructions on the memory device that cause the processor subsystem to:
      operate a host vehicle using a driving policy from a policy repository, the host vehicle operating in a lane on a first road, the driving policy governed by a safety model;
      detect a second vehicle, the second vehicle operating in a second lane;
      determine that the second vehicle is an intersecting vehicle, the intersecting vehicle operating on a second road that intersects the first road at an intersection;
      determine that the host vehicle has priority over the intersecting vehicle to right-of-way at the intersection of the first and second road;
      estimate a longitudinal distance and a lateral distance to occur between the host vehicle and the intersecting vehicle at a future time that the host vehicle is estimated to cross the intersection;
      determine, based on the longitudinal distance and the lateral distance, that the intersecting vehicle is not braking correctly to avoid conflict at the intersection with the host vehicle, at the future time that the host vehicle is estimated to cross the intersection; and
      initiate a vehicle maneuver of the host vehicle to reduce or avoid a collision with the intersecting vehicle, based on the safety model, in response to the determination that the intersecting vehicle is not braking correctly to avoid conflict at the intersection with the host vehicle;
      wherein the vehicle maneuver is applied by the host vehicle before entering the intersection and is based on the longitudinal distance and the lateral distance estimated to occur at the future time, and wherein the vehicle maneuver causes the host vehicle to initiate braking with at least a minimum braking rate.

2. The system of claim 1, wherein to initiate the vehicle maneuver of the host vehicle, the processor subsystem is to:
   determine that the longitudinal distance is below a first threshold value and that the lateral distance is below a second threshold value; and
   initiate the braking of the host vehicle in response to the determination that the longitudinal distance is below the first threshold value and the lateral distance is below the second threshold value.

3. The system of claim 2, wherein the longitudinal distance and the lateral distance is estimated based on a maximum acceleration capability of the intersecting vehicle, and wherein the maximum acceleration capability is bounded by a speed limit governing the second road.

4. The system of claim 1, wherein to initiate the vehicle maneuver of the host vehicle, the processor subsystem is to:
determine that the intersecting vehicle has failed to brake and has failed to provide the right-of-way to the host vehicle at the future time to cross the intersection; and
initiate the braking of the host vehicle in response to the determination that the host vehicle has priority and the intersecting vehicle has failed to brake.

5. The system of claim 1, the instructions further to cause the processor subsystem to use virtual objects to describe road boundaries in the safety model.

6. The system of claim 1, the instructions further to cause the processor subsystem to use virtual objects to describe static obstacles in the safety model.

7. The system of claim 1, wherein in response to the vehicle maneuver being applied by the host vehicle, the intersecting vehicle applies a corresponding vehicle maneuver which causes the intersecting vehicle to initiate braking with at least a minimum braking rate.

8. A method for controlling a vehicle using driving policies, the method comprising:
operating a host vehicle using a driving policy from a policy repository, the host vehicle operating in a lane on a first road, the driving policy governed by a safety model;
detecting a second vehicle, the second vehicle operating in a second lane;
determining that the second vehicle is an intersecting vehicle, the intersecting vehicle operating on a second road that intersects the first road at an intersection;
determining that the host vehicle has priority over the intersecting vehicle to right-of-way at the intersection of the first and second road;
estimating a longitudinal distance and a lateral distance to occur between the host vehicle and the intersecting vehicle at a future time that the host vehicle is estimated to cross the intersection;
determining, based on the longitudinal distance and the lateral distance, that the intersecting vehicle is not braking correctly to avoid conflict at the intersection with the host vehicle, at the future time that the host vehicle is estimated to cross the intersection; and
initiating a vehicle maneuver of the host vehicle to reduce or avoid a collision with the intersecting vehicle, based on the safety model, in response to determining that the intersecting vehicle is not braking correctly to avoid conflict at the intersection with the host vehicle;
wherein the vehicle maneuver is applied by the host vehicle before entering the intersection and is based on the longitudinal distance and the lateral distance estimated to occur at the future time, and wherein the vehicle maneuver causes the host vehicle to initiate braking with at least a minimum braking rate.

9. The method of claim 8, wherein initiating the vehicle maneuver of the host vehicle comprises:
determining that the longitudinal distance is below a first threshold value and that the lateral distance is below a second threshold value; and
initiating the braking of the host vehicle in response to determining that the longitudinal distance is below the first threshold value and the lateral distance is below the second threshold value.

10. The method of claim 9, wherein the longitudinal distance and the lateral distance is estimated based on a maximum acceleration capability of the intersecting vehicle, and wherein the maximum acceleration capability is bounded by a speed limit governing the second road.

11. The method of claim 8, wherein initiating the vehicle maneuver of the host vehicle comprises:
determining that the intersecting vehicle has failed to brake and has failed to provide the right-of-way to the host vehicle at the future time to cross the intersection; and
initiating the braking of the host vehicle in response to determining that the host vehicle has priority and the intersecting vehicle has failed to brake.

12. The method of claim 8, further comprising using virtual objects to describe road boundaries in the safety model.

13. The method of claim 8, further comprising using virtual objects to describe static obstacles in the safety model.

14. The method of claim 8, wherein in response to the vehicle maneuver being applied by the host vehicle, the intersecting vehicle applies a corresponding vehicle maneuver which causes the intersecting vehicle to initiate braking with at least a minimum braking rate.

15. At least one non-transitory machine-readable medium including instructions for controlling a vehicle using driving policies, the instructions when executed by a machine, cause the machine to perform operations comprising:
operating a host vehicle using a driving policy from a policy repository, the host vehicle operating in a lane on a first road, the driving policy governed by a safety model;
detecting a second vehicle, the second vehicle operating in a second lane;
determining that the second vehicle is an intersecting vehicle, the intersecting vehicle operating on a second road that intersects the first road at an intersection;
determining that the host vehicle has priority over the intersecting vehicle to right-of-way at the intersection of the first and second road;
estimating a longitudinal distance and a lateral distance to occur between the host vehicle and the intersecting vehicle at a future time that the host vehicle is estimated to cross the intersection;
determining, based on the longitudinal distance and the lateral distance, that the intersecting vehicle is not braking correctly to avoid conflict at the intersection with the host vehicle, at the future time that the host vehicle is estimated to cross the intersection; and
initiating a vehicle maneuver of the host vehicle to reduce or avoid a collision with the intersecting vehicle, based on the safety model, in response to determining that the intersecting vehicle is not braking correctly to avoid conflict at the intersection with the host vehicle;
wherein the vehicle maneuver is applied by the host vehicle before entering the intersection and is based on the longitudinal distance and the lateral distance estimated to occur at the future time, and wherein the vehicle maneuver causes the host vehicle to initiate braking with at least a minimum braking rate.

16. The at least one machine-readable medium of claim 15, wherein initiating the vehicle maneuver of the host vehicle comprises:
determining that the longitudinal distance is below a first threshold value and that the lateral distance is below a second threshold value; and initiating the braking of the host vehicle in response to determining that the longitudinal distance is below the first threshold value and the lateral distance is below the second threshold value.

17. The at least one machine-readable medium of claim 16, wherein the longitudinal distance and the lateral distance is estimated based on a maximum acceleration capability of the intersecting vehicle, and wherein the maximum acceleration capability is bounded by a speed limit governing the second road.

18. The at least one machine-readable medium of claim 15, wherein initiating the vehicle maneuver of the host vehicle comprises:
   determining that the intersecting vehicle has failed to brake and has failed to provide the right-of-way to the host vehicle at the future time to cross the intersection; and
   initiating the braking of the host vehicle in response to determining that the host vehicle has priority and the intersecting vehicle has failed to brake.

19. The at least one machine-readable medium of claim 15, further comprising using virtual objects to describe road boundaries in the safety model.

20. The at least one machine-readable medium of claim 15, further comprising using virtual objects to describe static obstacles in the safety model.

21. The at least one machine-readable medium of claim 15, wherein in response to the vehicle maneuver being applied by the host vehicle, the intersecting vehicle applies a corresponding vehicle maneuver which causes the intersecting vehicle to initiate braking with at least a minimum braking rate.

* * * * *